United States Patent [19]
Tobita et al.

[11] Patent Number: 5,157,746
[45] Date of Patent: Oct. 20, 1992

[54] OPTICAL WAVEGUIDE ARRAY INCLUDING TWO-DIMENSIONAL LENS AND ITS MANUFACTURING METHOD

[75] Inventors: Manabu Tobita; Makoto Suzuki, both of Nagoya, Japan

[73] Assignee: Brother Kogyo Kabushiki Kaisha, Japan

[21] Appl. No.: 711,304

[22] Filed: Jun. 6, 1991

[30] Foreign Application Priority Data

Jun. 8, 1990 [JP] Japan ................. 2-151401
Jun. 8, 1990 [JP] Japan ................. 2-151402

[51] Int. Cl.⁵ .............. G02B 6/10; G03G 15/02; H01L 21/265
[52] U.S. Cl. ................... 385/33; 385/14; 385/34; 385/143; 385/145; 385/124; 385/131; 385/132; 430/57; 430/127; 430/130; 437/21; 437/36; 437/51; 437/138
[58] Field of Search ............... 385/33, 34, 143, 144, 385/145, 130, 131, 132, 124, 14; 430/56, 57, 127, 128, 129, 130, 132, 133, 198; 437/20, 21, 22, 36, 51, 147, 138, 150, 152, 153

[56] References Cited

U.S. PATENT DOCUMENTS

| | | | |
|---|---|---|---|
| 4,445,759 | 5/1984 | Valette | 385/130 |
| 4,712,854 | 12/1987 | Mikami et al. | 385/124 |
| 4,779,259 | 10/1988 | Kono et al. | 385/33 |
| 4,877,717 | 10/1989 | Suzuki et al. | 359/619 |
| 4,911,512 | 3/1990 | Yamamoto et al. | 385/33 |
| 4,937,808 | 6/1990 | Shimada et al. | 385/33 |
| 4,983,499 | 1/1991 | Suzuki et al. | 385/33 |
| 5,061,029 | 10/1991 | Ishikawa | 385/14 |
| 5,062,688 | 11/1991 | Okuda et al. | 359/619 |
| 5,071,216 | 12/1991 | Sullivan | 385/34 |
| 5,073,041 | 12/1991 | Rastani | 385/33 |
| 5,100,220 | 3/1992 | Voegeli | 385/33 |
| 5,101,454 | 3/1992 | Blonder et al. | 385/33 |

Primary Examiner—Brian Healy
Attorney, Agent, or Firm—Oliff & Berridge

[57] ABSTRACT

An optical waveguide array includes a two-dimensionally refractive index profile lens for focusing light beams in a scanning direction. The two-dimensionally refractive index profile lens is bonded to or integrally formed with the optical waveguide array. The refractive index is distributed in the two-dimensionally refractive index profile lens by changing the irradiation energy of ultraviolet ray during the manufacture. As a member for focusing the light beams in the irradiation direction which is perpendicular to the scanning direction, another two-dimensionally refractive index profile lens or a cylindrical lens is used. The optical waveguide array with such an inexpensive structure can focus the light beams both in the scanning direction and the irradiation direction. The resolution of the latent image formed on a photosensitive member can thus be improved.

19 Claims, 13 Drawing Sheets

FIG. 1B    FIG. 1A    FIG. 1C
DISTRIBUTION IN y-DIRECTION OF REFRACTIVE INDEX OF LENS 23
DISTRIBUTION IN y-DIRECTION OF REFRACTIVE INDEX OF ARRAY 1
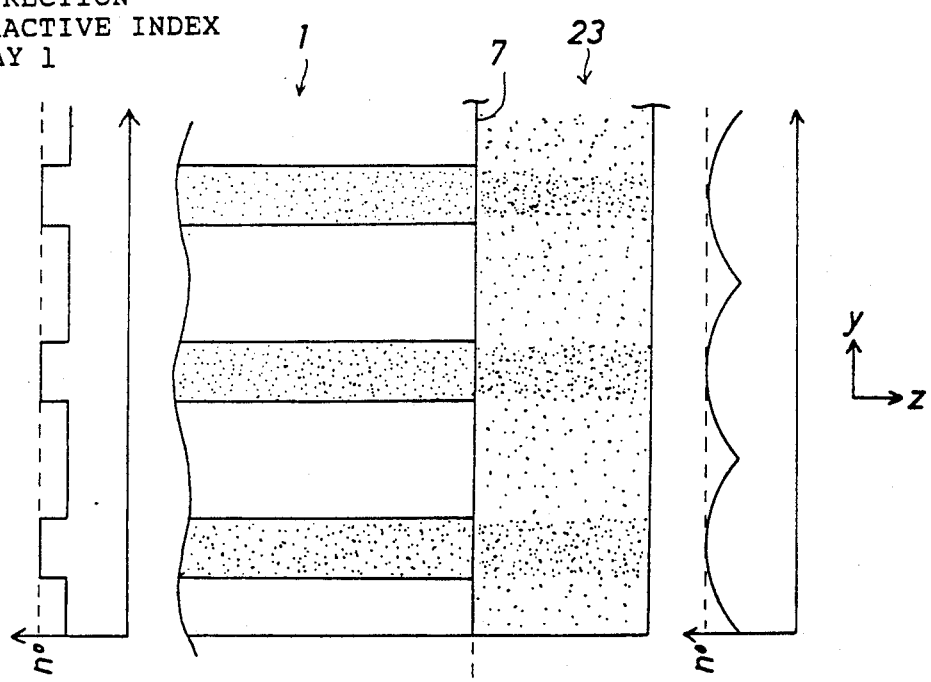
DISTRIBUTION IN x-DIRECTION OF REFRACTIVE INDEX OF ARRAY 1 AND LENS 23
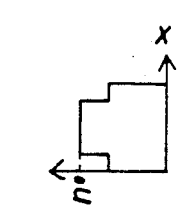
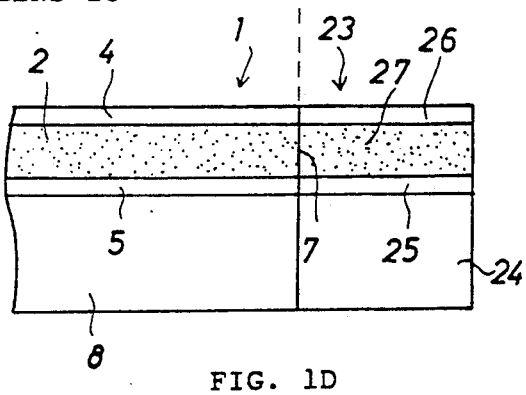
FIG. 1E
FIG. 1D

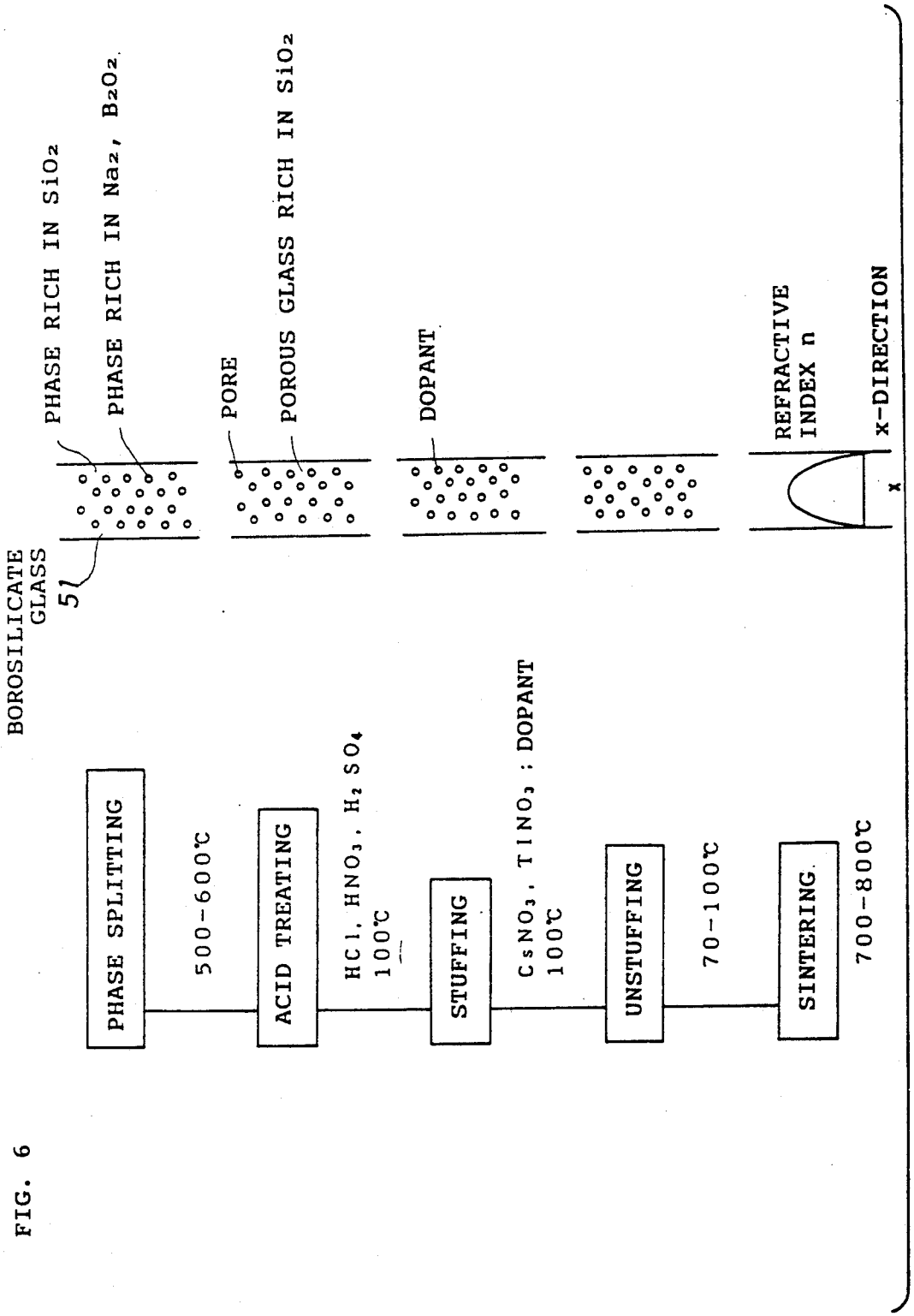

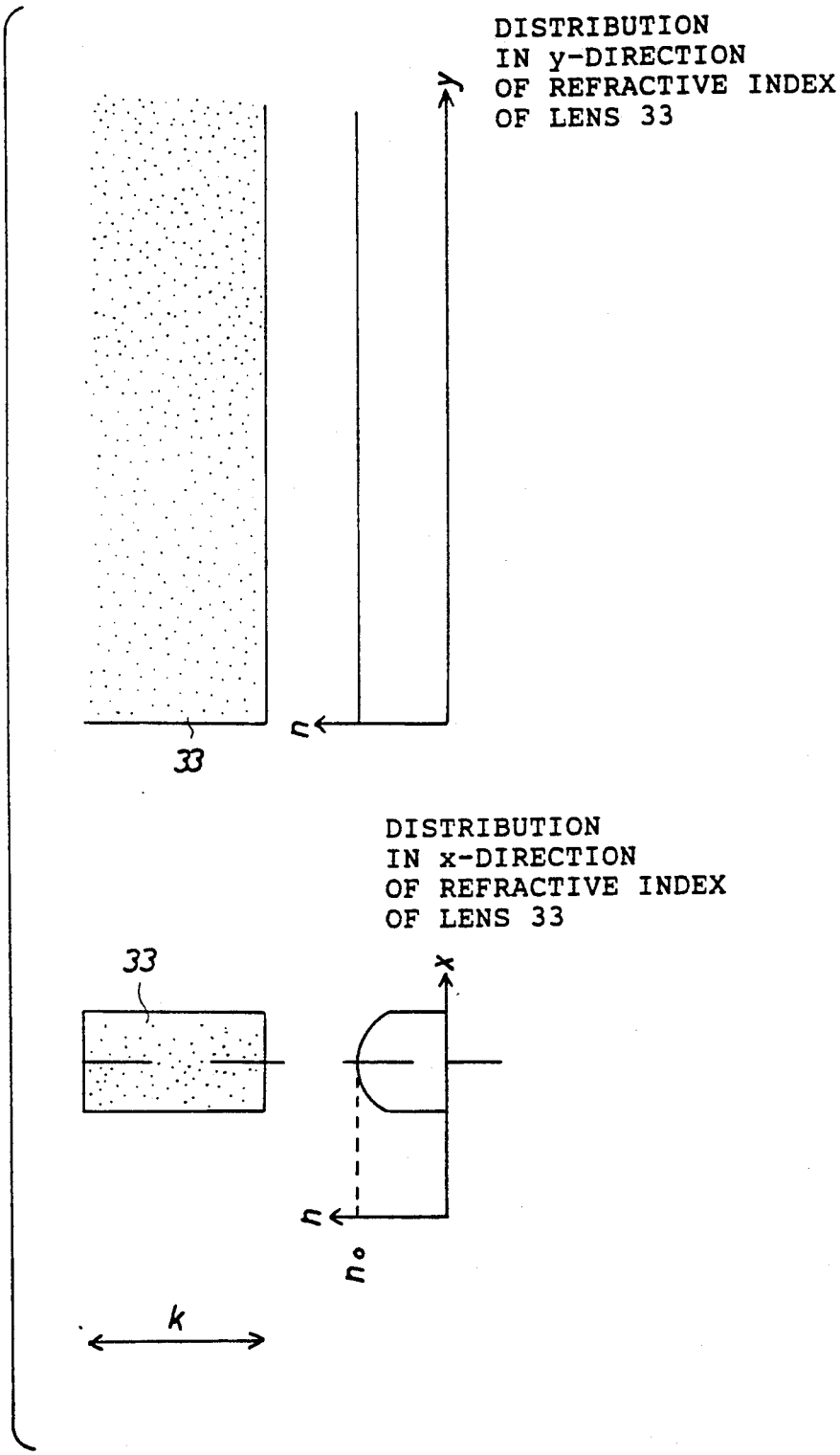

FIG. 9B
DISTRIBUTION
IN y-DIRECTION
OF REFRACTIVE INDEX
OF PORTION A
FIG. 9A
FIG. 9C
DISTRIBUTION
IN y-DIRECTION
OF REFRACTIVE INDEX
OF PORTION B
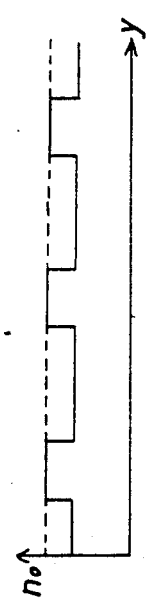
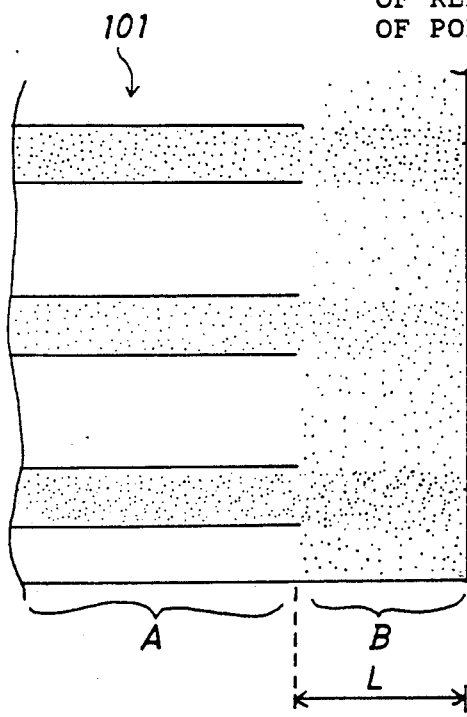
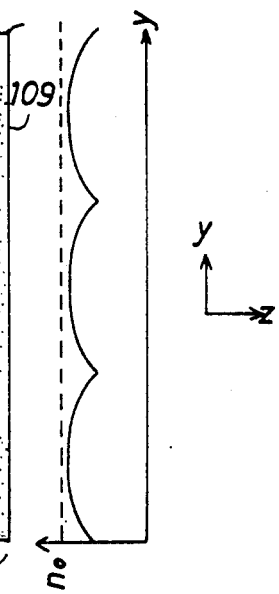
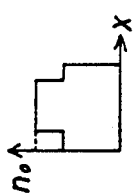
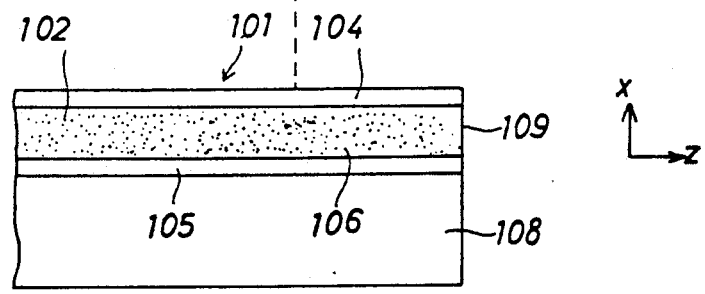
DISTRIBUTION
IN x-DIRECTION
OF REFRACTIVE INDEX
OF PORTIONS A AND B
FIG. 9E
FIG. 9D

OPTICAL WAVEGUIDE ARRAY INCLUDING TWO-DIMENSIONAL LENS AND ITS MANUFACTURING METHOD

BACKGROUND OF THE INVENTION

This invention relates to an optical waveguide array having lens, in which a refractive index is distributed two-dimensionally, and also relates to a method for manufacturing the optical waveguide array. The optical waveguide array is, for example, used for an optical scanning unit mounted on a laser printer.

Optical scanning units using an optical waveguide array and mounted on the laser printer are known in the art and, for example, one is shown in FIG. 13. The optical scanning unit in FIG. 13 uses an optical waveguide array 95. A semiconductor laser 91 emits light beams. The light beams pass through a image-forming lens member 93, and are deflected by a polygonal mirror 94 which is rotating at a constant speed. The light beams deflected by the polygonal mirror 94 are propagated from an incidence portion 95A through the optical waveguide array 95, are emitted from an irradiation portion 95B, and are then focused on a lens array 97. Subsequently, the light beams are scanned on a photosensitive drum 96, which is rotating at a constant speed, in the direction parallel the rotational axis of the photosensitive drum 96, as shown by an arrow E. The lens array 97 focuses the light beams emitted from the irradiation portion 95B in the direction traverse with and perpendicular to the scanning direction shown by the arrow E. As shown in FIG. 12, without the lens array 97, however, the light beams would diverge from the irradiation portion 95B by angle $\theta c$. The angle $\theta c$ is determined by the numerical aperture NA of the optical waveguide array 95 according to the equation of $\theta c = \sin^{-1}(NA)$. In this case, the spot diameter of the light beams irradiated on the surface of the photosensitive drum 96 is thus enlarged, thereby impairing the resolution of a latent image formed on the surface of the photosensitive drum 96. To improve the resolution of the latent image, the related art shown in FIG. 13 has the lens array 97 inserted between the irradiation portion 95B of the optical waveguide array 95 and the photosensitive drum 96, so that the light beams emitted from the irradiation portion 95B are focused on the surface of the photosensitive drum 96. The lens array 97 is very expensive, thereby adding to the cost of the optical scanning unit.

SUMMARY OF THE INVENTION

Wherefore, an object of this invention is to provide an optical waveguide array using a two-dimensionally refractive index profile lens, and a method for manufacturing the two-dimensionally refractive index profile lens.

Another object of this invention is to provide an optical waveguide array using an inexpensive member for focusing light beams only in the direction along the irradiating direction and perpendicular to the scanning direction, to improve the resolution of the latent image formed on a photosensitive drum, and to provide a method for manufacturing the optical waveguide array.

To solve these and other objects, this invention provides an optical waveguide array using a two-dimensionally refractive index profile lens. The optical waveguide array comprises a plurality of optical waveguides. Each of the optical waveguides comprises an incidence portion for injecting light beams through the optical waveguide, and an irradiation portion for irradiating the light beams from the optical waveguide. The incidence portion and the irradiation portion of the optical waveguide are connected. Thus, the light beams are propagated from the incidence portion to the irradiation portion. The two-dimensionally refractive index profile lens for focusing the light beams emitted from the irradiation portion in a scanning direction is secured onto the irradiation portion.

This invention also provides a method for manufacturing the two-dimensionally refractive index profile lens. The method comprises the step of laying a first material onto a second material. The second material is planar and is able to transmit light beams. The first material is able to transmit light beams and has a refractive index varied through photo polymerization. The method further comprises the step of forming a portion in which the refractive index is distributed two-dimensionally by continuously varying the irradiation energy of light beams irradiated onto the surface of the first material. The method finally comprises the step of coating the surface of the first material with the second material or a third material having a refractive index less than that of the first material.

This invention further provides an optical waveguide array according to a second embodiment. The optical waveguide array comprises a plurality of optical waveguides. Each of the optical waveguides comprises an incidence portion for injecting light beams through the optical waveguide, and an irradiation portion for irradiating the light beams from the optical waveguide. The incidence portion and the irradiation portion are connected. Thus, the light beams are propagated from the incidence portion to the irradiation portion. A two-dimensionally refractive index profile lens for focusing the light beams emitted from the irradiation portion in a scanning direction is formed integrally with the irradiation portion.

This invention also provides a method for manufacturing the optical waveguide array according to the second embodiment. The method comprises the step of laying a first material onto a second material. The second material is planar and is able to transmit light beams. The first material is able to transmit light beams and has a refractive index varied through photo polymerization. The method further comprises the step of forming a first portion in which the refractive index is constant and larger than that of the second material by irradiating the light beams onto the surface of the first material with a constant irradiation energy. The method further comprises the step of forming a second portion integral with the first portion by continuously varying the irradiation energy of the light beams to form a waveguide pattern. In the second portion, the refractive index is distributed two-dimensionally. The method finally comprises the step of coating the surface of the first material with the second material or a third material having the same refractive index as the refractive index of the second material.

BRIEF DESCRIPTION OF THE DRAWINGS

FIG. 1A is a top plan view of an optical waveguide array and a two-dimensionally refractive index profile lens for the first embodiment of this invention.

FIG. 1B is a graph showing the distribution of the refractive index of the optical waveguide array in a scanning direction.

FIG. 1C is a graph showing the distribution of the refractive index of the two-dimensionally refractive index profile lens in the scanning direction.

FIG. 1D is a side view of the optical waveguide array and the two-dimensionally refractive index profile lens.

FIG. 1E is a graph showing the distribution of the refractive index of the optical waveguide array and the two-dimensionally refractive index in the direction perpendicular to the scanning direction.

FIG. 3 through 3D are explanatory views showing in order the processes for manufacturing the two-dimensionally refractive index profile lens for focusing light beams in the scanning direction.

FIG. 6 is an explanatory view showing another processes for manufacturing the two-dimensionally refractive index profile lens for focusing the light beams in the direction perpendicular to the scanning direction.

FIG. 7 is an explanatory view showing the distribution of the refractive index of the top surface, the side surface and the core layer of the two-dimensionally refractive index profile lens.

FIG. 9A is a top plan view of an optical waveguide array including a two-dimensionally refractive index profile lens portion for the second embodiment of this invention.

FIG. 9B is a graph showing the distribution of the refractive index of the optical waveguide array in the scanning direction.

FIG. 9C is a graph showing the distribution of the refractive index of the two-dimensionally refractive index profile lens portion in the scanning direction.

FIG. 9D is a side view of the optical waveguide array including the two-dimensionally refractive index profile lens portion.

FIG. 9E is a graph showing the distribution of the refractive index of the optical waveguide array and the two-dimensionally refractive index portion in the direction perpendicular to the scanning direction.

Figure 2:
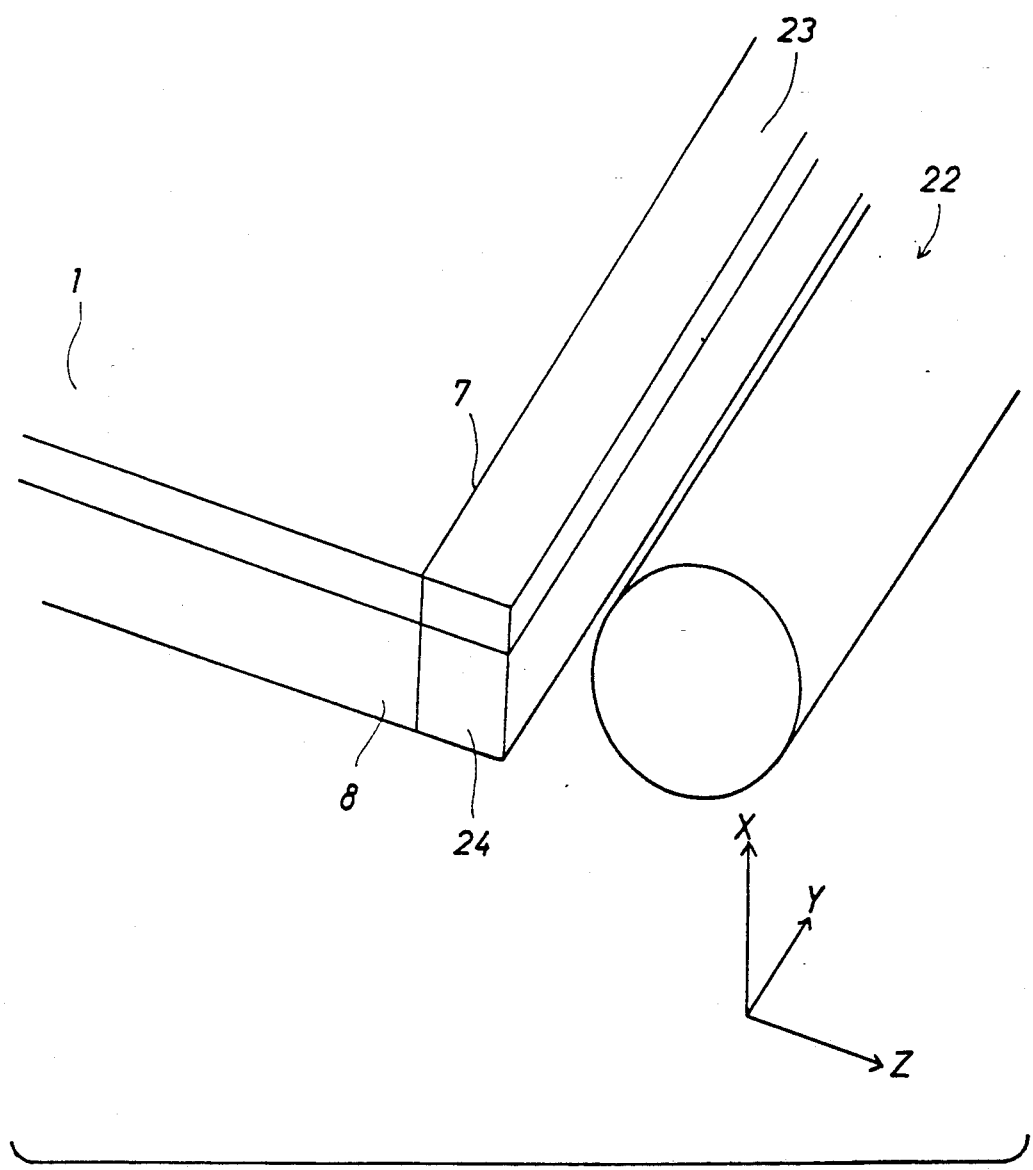
FIG. 2 is a perspective view around an irradiation portion of an optical scanning unit.
Figure 3:
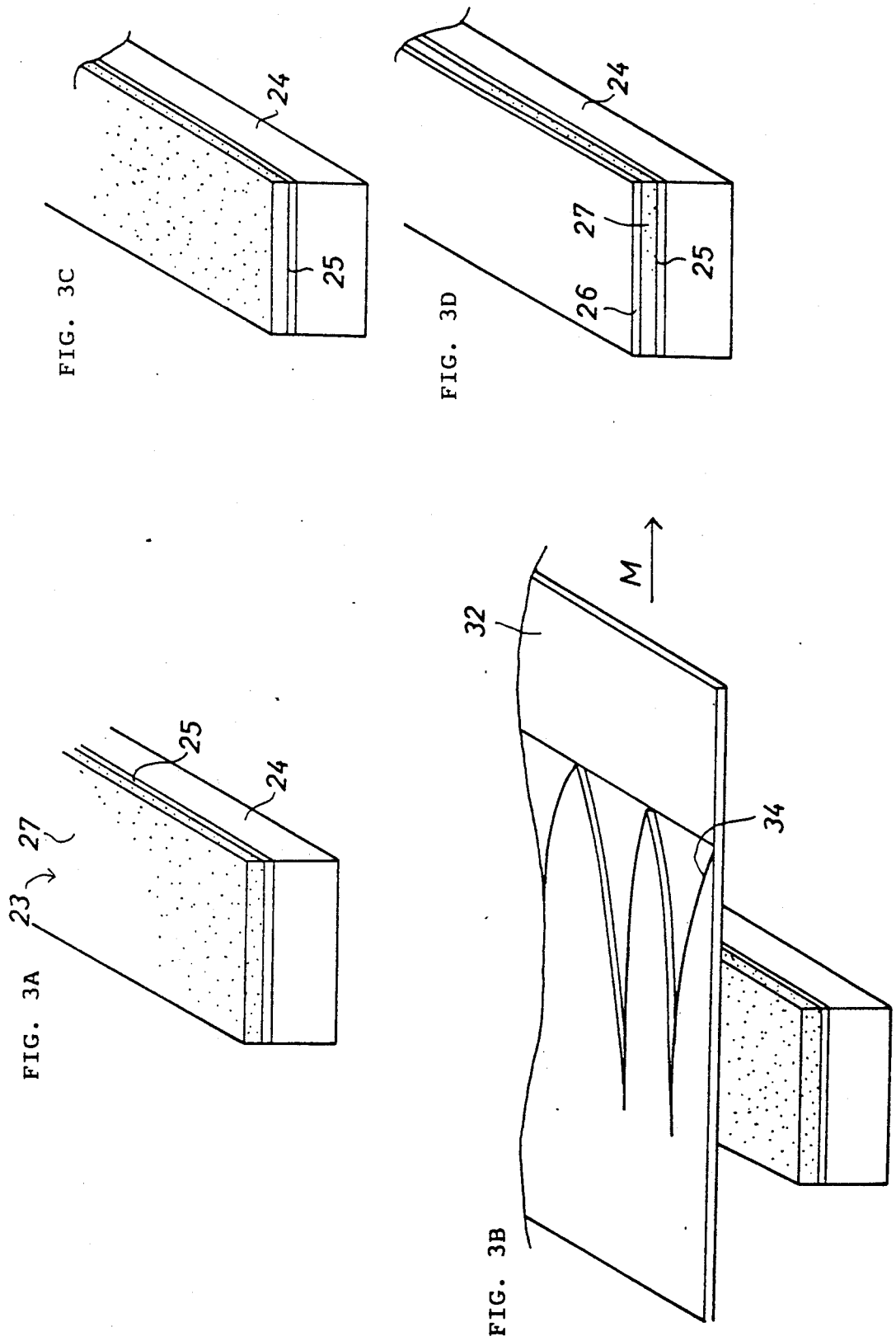

DETAILED DESCRIPTION OF THE PREFERRED EMBODIMENTS:

The first embodiment of this invention will now be explained, referring to FIGS. 1 through 8. As shown in FIG. 2, an optical scanning unit comprises an optical waveguide array 1. As shown in FIG. 1D, the optical waveguide array 1 is formed on a substrate 8 and comprises two clad layers 4 and 5. A core layer 2 is inserted between the clad layers 4 and 5. As shown in the graph of FIG. 1B, the refractive index of the two clad layers 4 and 5 is low, whereas the core layer 2 has the refractive index distributed as shown by dots in FIGS. 1A and 1D. The optical waveguide array 1 has an irradiation interface 7. As shown in FIGS. 1D and 2, a two-dimensionally refractive index profile lens 23 is laid onto a substrate 24. The two-dimensionally refractive index profile lens 23 is bonded to the irradiation interface 7 so that the center of the two-dimensionally refractive index profile lens 23 coincides with the height of the optical axis of each optical waveguide composing the optical waveguide array 1. The two-dimensionally refractive index profile lens 23 comprises two clad layers 25 and 26. The refractive index of the clad layers 25 and 26 is low. A core layer 27 is inserted between the clad layers 25 and 26, and has a refractive index distributed as shown by the dots in FIGS. 1A and 1D. As shown in FIG. 1C, in the core layer 27, the refractive index is distributed two-dimensionally in a scanning direction (hereinafter referred to as "y-direction"). The refractive index $n(y)$ of the core layer 27 of the two-dimensionally refractive index profile lens 23 is distributed as shown by the following equation:

$$n(y) = no\{1 - \tfrac{1}{2}a^2(y - yn)^2\} \tag{1}$$

In the equation denotes a constant yn denotes the position of the center in the y-direction of each optical waveguide composing the optical waveguide array 1, and no denotes the refractive index of the core layer 2 of the optical waveguide array 1 and the refractive index in the y-direction of the two-dimensionally refractive index profile lens 23. As shown in FIG. 1E, the refractive index of the core layer 27 is constant in the direction perpendicular to the scanning direction (hereinafter referred to as the "x-direction") and in an irradiation direction (hereinafter referred to as the "z-direction"). As shown in FIG. 1A, the two-dimensionally refractive index profile lens 23 has a length L from the irradiation interface 7. The length L is between the quarter and the half of the snaking cycle $2\pi/\alpha$ of light beams in the two-dimensionally refractive index profile lens 23, that is, between $\pi/2\alpha$ and $\pi/\alpha$. The light beams emitted from the irradiation interface 7 of the optical waveguide array 1 into the two-dimensionally refractive index profile lens 23 are focused as shown by the following equation.

$$Zf = -1/no\alpha \cdot \tan \alpha L \tag{2}$$

In the equation, Zf denotes a distance from the irradiation interface 7 of the optical waveguide array 1 to the focus of the light beams. As aforementioned, the two-dimensionally refractive index profile lens 23 focuses the light beams emitted from the irradiation interface 7 of the optical waveguide array 1 in the y-direction corresponding to the scanning direction. The distribution of the refractive index of the core layer 27 of the two-dimensionally refractive index profile lens 23 may approximate the distribution obtained by the equation (1). The length of the two-dimensionally refractive index profile lens 23 may be obtained by adding to the length L the integral multiple of the snaking cycle of the light beams in the two-dimensionally refractive index profile lens 23.

A method for manufacturing the two-dimensionally refractive index profile lens 23 for focusing the light beams in the y-direction will now be explained, referring to FIGS. 3A through 3D. As shown in FIG. 3A, the clad layer 25 of polymethyl methacrylate (hereinafter referred to as "PMMA") is formed on the substrate 24. Over the clad layer 25, the core layer 27 is formed. The core layer 27 comprises a PMMA layer containing styrene or other resin the refractive index of which can be varied through photo polymerization. The variable refractive index of such resin can be controlled by the irradiation energy of ultraviolet ray. Therefore, the desired distribution of the refractive index can be attained by varying the irradiation energy of ultraviolet ray. Subsequently, as shown in FIG. 3B, ultraviolet ray is irradiated while moving a mask 32 in the direction shown by an arrow M. The mask 32 has an ultraviolet transmission opening 34 in the form of wedges. The wedges have vertexes at the center of each optical waveguide composing the optical waveguide array 1 and are longer than the two-dimensionally refractive index profile lens 23. When the ultraviolet ray is irradiated while moving the mask 32 in the direction shown by the arrow M, the elongation of the center of each optical waveguide is irradiated with the ultraviolet ray for a relatively long time. The surface area of the core layer 27 more distant from the center of each optical waveguide is exposed to the ultraviolet ray for a shorter time period. The configuration of the wedges forming the ultraviolet transmission opening 34 determines the time period for the exposure to the ultraviolet ray. The configuration of the ultraviolet transmission opening 34 is determined such that the time period of the exposure to the ultraviolet ray is appropriate for the desired refractive index, by considering the relationship between the irradiation energy of the ultraviolet ray and the variances in the refractive index. Subsequently, as shown in FIG. 3C, unreacted monomer is removed through baking. As shown in FIG. 3D, the clad layer 26 of PMMA is formed. Through the aforementioned processes, the two-dimensionally refractive index profile lens 23 for focusing the light beams in the y-direction is manufactured.

Figures 8A, 8B:
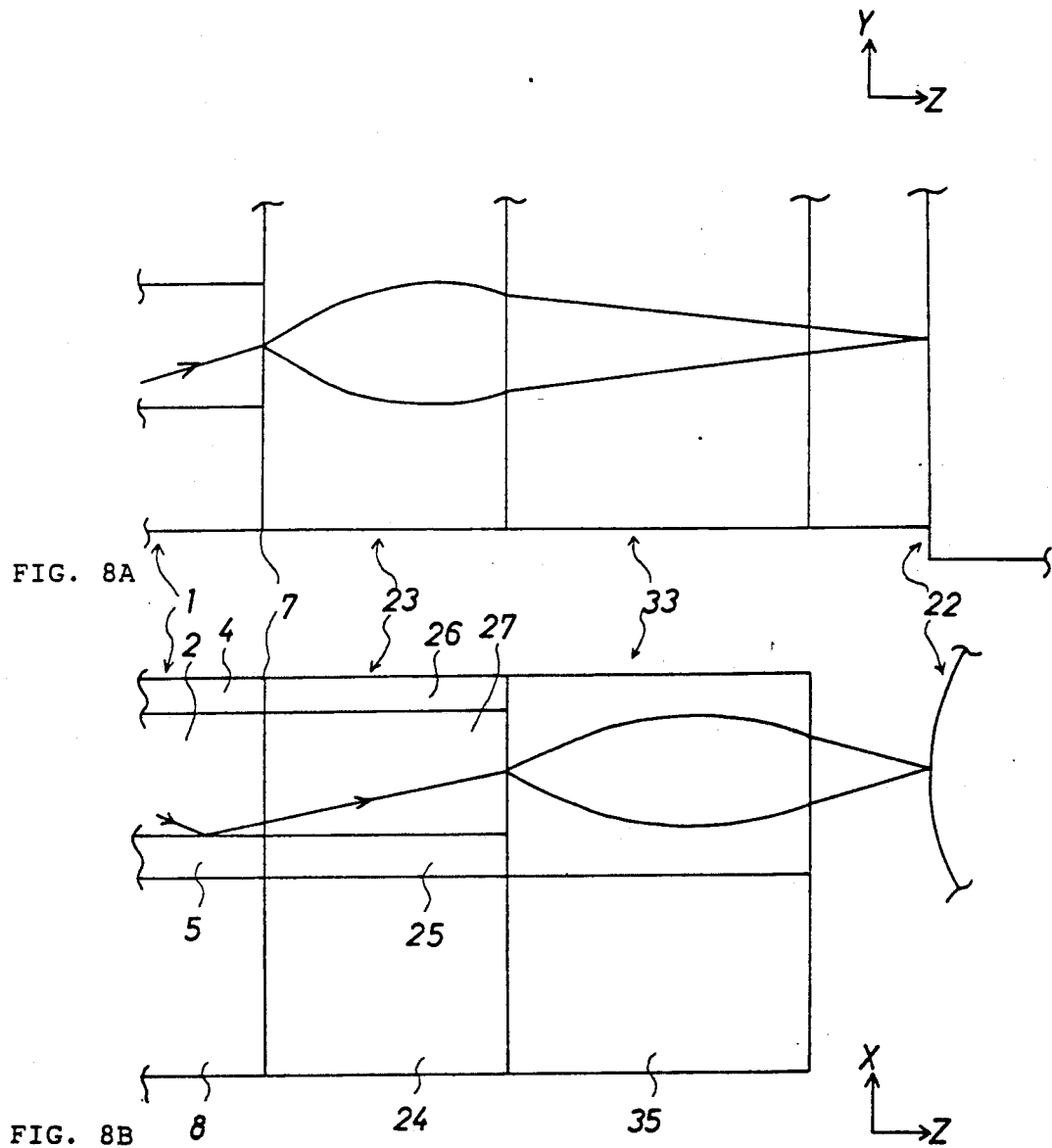
FIGS. 8A and 8B are explanatory views of the top surface and the side surface, respectively, of the two-dimensionally refractive index profile lens for focusing the light beams in the direction perpendicular to the scanning direction.

In addition to the two-dimensionally refractive index profile lens 23 bonded onto the irradiation interface 7 of the optical waveguide array 1, the optical scanning unit requires a member for focusing the light beams in the x-direction. In the first embodiment, as shown in FIGS. 7, 8A and 8B, another two-dimensionally refractive index profile lens 33 is provided adjacent lens 23 for focusing the light beams in the x-direction. As shown in FIG. 7, the refractive index of the two-dimensionally refractive index profile lens 33 decreases in proportion to the squared distance from the central axis of the light beams. The two-dimensionally refractive profile lens 33 has the axially symmetric distribution of the refractive index in the x-direction. The light beams irradiated into the two-dimensionally refractive index profile lens 33 are focused in the x-direction in the same way as the light beams into the optical waveguide array 1. The two-dimensionally refractive index profile lens 33 has a constant refractive index in the y-direction. The light beams go straight in the y-direction through the two-dimensionally refractive index profile lens 33, keeping their incident angle.

As shown in FIGS. 8A and 8B, in the optical scanning unit of the first embodiment, the two-dimensionally refractive index profile lens 33 is laid on a substrate 35 so that the height of the optical axis of the two-dimensionally refractive index profile lens 33 coincides with that of the optical axis of the two-dimensionally refractive index profile lens 23 for focusing the light beams in the y-direction. As shown in FIGS. 8A and 8B, the light beams emitted from the optical waveguide array 1 are focused in the y-direction by the two-dimensionally refractive index profile lens 23. By irradiating the light beams from the two-dimensionally refractive index profile lens 23 into the two-dimensionally refractive index profile lens 33, the light beams are also focused in the x-direction. The distribution of the refractive index and the length k of the two-dimensionally refractive index profile lens 33 are determined such that the focal point of the light beams from the two-dimensionally refractive index profile lens 33 meets the focal point in the y-direction of the light beams emitted from the optical waveguide array 1. As shown in FIGS. 8A and 8B, by placing a photosensitive drum 22 onto the focal point, the light beams from the two-dimensionally refractive index profile lens 33 are in focus on the surface of the photosensitive drum 22. Consequently, the use of the two-dimensionally refractive index profile lenses 23 and 33 can improve the resolution of the latent image.

Figure 4:
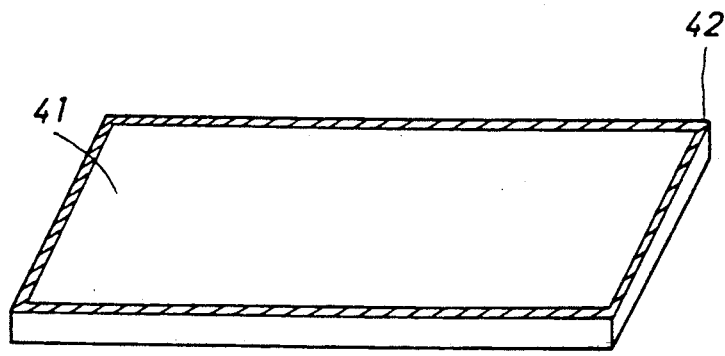
FIG. 4 is a perspective view showing a mask attached during the manufacturing of a two-dimensionally refractive index profile lens for focusing light beams in the direction perpendicular to the scanning direction.
Figure 5A:
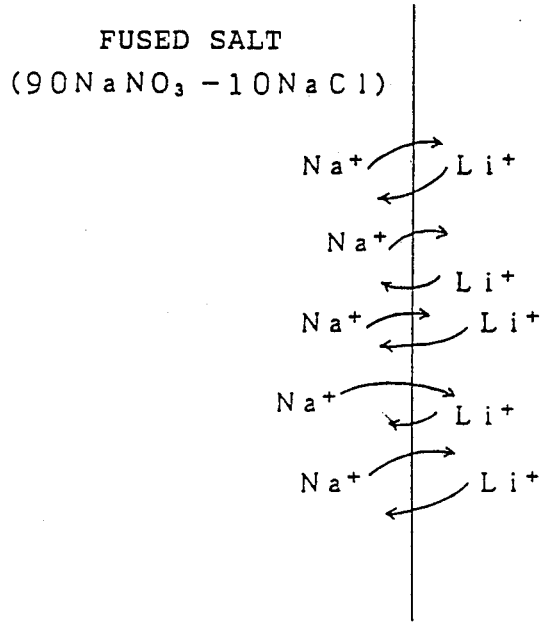
FIGS. 5A, 5B, and 5C are explanatory views showing the ion exchange performed during the manufacturing of the two-dimensionally refractive index profile lens for focusing light beams in the direction perpendicular to the scanning direction.
Figure 5B:
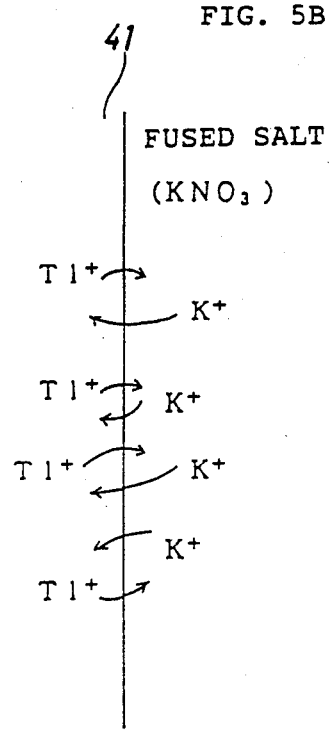
Figure 5C:
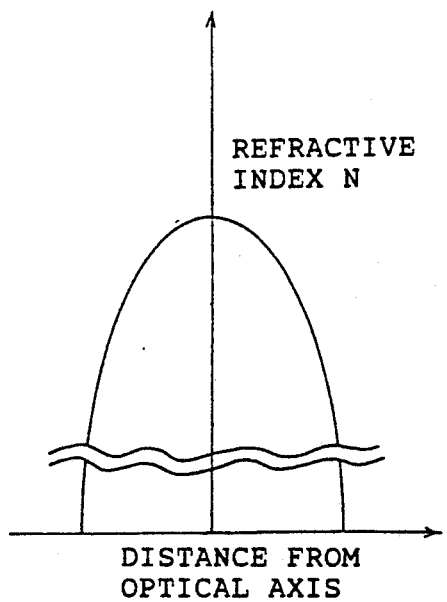

A method for manufacturing the two-dimensionally refractive index profile lens 33 having the refractive index distributed in the x-direction will now be explained, referring to FIGS. 4 and 5. First, as shown in FIG. 4, the side surfaces of a glass plate 41 are covered with a mask 42. The glass plate 41 contains ions for increasing the refractive index such as Li (lithium), Cs (cesium), Tl (thulium), or other ion. As shown in FIGS. 5A and 5B respectively, the glass plate 41 with the mask 42 is immersed in fused salt ($90NaNO_3 - 10NaCl$) containing Na (natrium) or fused salt containing K (potassium) ion, thereby exchanging the ions in the glass plate 41 with the ions in the fused salt at a high temperature. Consequently, the concentration gradient of the ions for increasing the refractive index are formed in the glass plate 41. The two-dimensionally refractive index profile lens 33 is thus manufactured. As shown in FIG. 5C, the refractive index of the two-dimensionally refractive index profile lens 33 decreases in proportion to the squared distance from the central axis of the light beams.

Another method for manufacturing the two-dimensionally refractive index profile lens 33 having the refractive index distributed in the x-direction will now be explained, referring to FIG. 6. First, through phase splitting between the temperatures of about 500° C. and 600° C., a borosilicate glass 51 with a phase rich in $SiO_2$ (silica gel) and a phase rich in $Na_2$ (sodium) or $B_2O_2$ (boric acid) is obtained. Subsequently, a porous glass rich in $SiO_2$ is obtained by treating the borosilicate glass 51 with HCl (hydrogen chloride), $HNO_3$ (nitric acid) or $H_2SO_4$ (sulfuric acid) at about 100° C. Subsequently, through the stuffing process at about 100° C., the porous glass is stuffed with a dopant such as the aqueous solution of CsNO₃ (cesium nitrate) or TlNO₃ (thallium nitrate). Subsequently, through the unstuffing process between about 70° C. and 100° C., the side surfaces of the porous glass are masked such as the glass plate 41 in FIG. 4, and the dopant is eluted from the pores in the porous glass. Finally, through the sintering process between about 700° C. and 800° C., the porous glass is dried, sintered and transformed into a non-porous glass. The two-dimensionally refractive index profile lens 33 having the refractive index distributed in the x-direction is thus manufactured.

The second embodiment of this invention will now be explained, referring to FIGS. 9A through 11E. In the second embodiment, the two-dimensionally refractive index profile lens for focusing the light beam in the y-direction corresponding to the scanning direction is an integral part of the optical waveguide array. As a member for focusing the light beam in the x-direction, perpendicular to the scanning direction, a cylindrical lens is used.

As shown in FIG. 9D, an optical waveguide array 101 is formed on a substrate 108. The optical waveguide array 101 comprises two clad layers 104 and 105. Between the clad layers 104 and 105 a core layer 102 is inserted. As shown in FIG. 9B, the clad layers 104 and 105 have the low refractive index, and the core layer 102 has the distributed refractive index. As shown in FIG. 9A, the optical waveguide array 101 comprises an optical waveguide array portion A and a two-dimensionally refractive index profile lens portion B in which, as shown in FIG. 9C, the refractive index is distributed in the y-direction corresponding to the scanning direction. The two-dimensionally refractive index profile lens portion B corresponds to the two-dimensionally refractive index profile lens 23 in the first embodiment. Unlike the two-dimensionally refractive index profile lens 23, the two-dimensionally refractive index profile lens portion B is an integral part of the optical waveguide array 101. Except this respect, the optical waveguide array 101 is almost the same as the optical waveguide array 1 of the first embodiment. The two-dimensionally refractive index profile lens portion B has a core portion 106. The refractive index of the core portion 106 of the two-dimensionally refractive index profile lens portion B is distributed in the same way as the refractive index n(y) of the core layer 27 of the two-dimensionally refractive index profile lens 23 for the first embodiment, as shown in the equation (1). As shown in FIG. 9E, the refractive index of the optical waveguide array 101 is constant in the x-direction and the z-direction. As shown in FIG. 9A, the length of the two-dimensionally refractive index profile lens portion B is the same as the length L of the two-dimensionally refractive index profile lens 23 of the first embodiment. The focal length of the light beams emitted from the irradiation surface 109 of the optical waveguide array 101 is obtained in the following equation.

$$Zf1 = -1/n o\alpha \, \tan \alpha L \ldots \quad (2)'$$

In the equation, Zf1 denotes the distance from the irradiation surface 109 of the optical waveguide array 101 to the focus of the light beams. Other factors are the same as those in the equation (2). In the second embodiment, the optical waveguide array 101 focuses the light beams in the y-direction.

Figure 10:
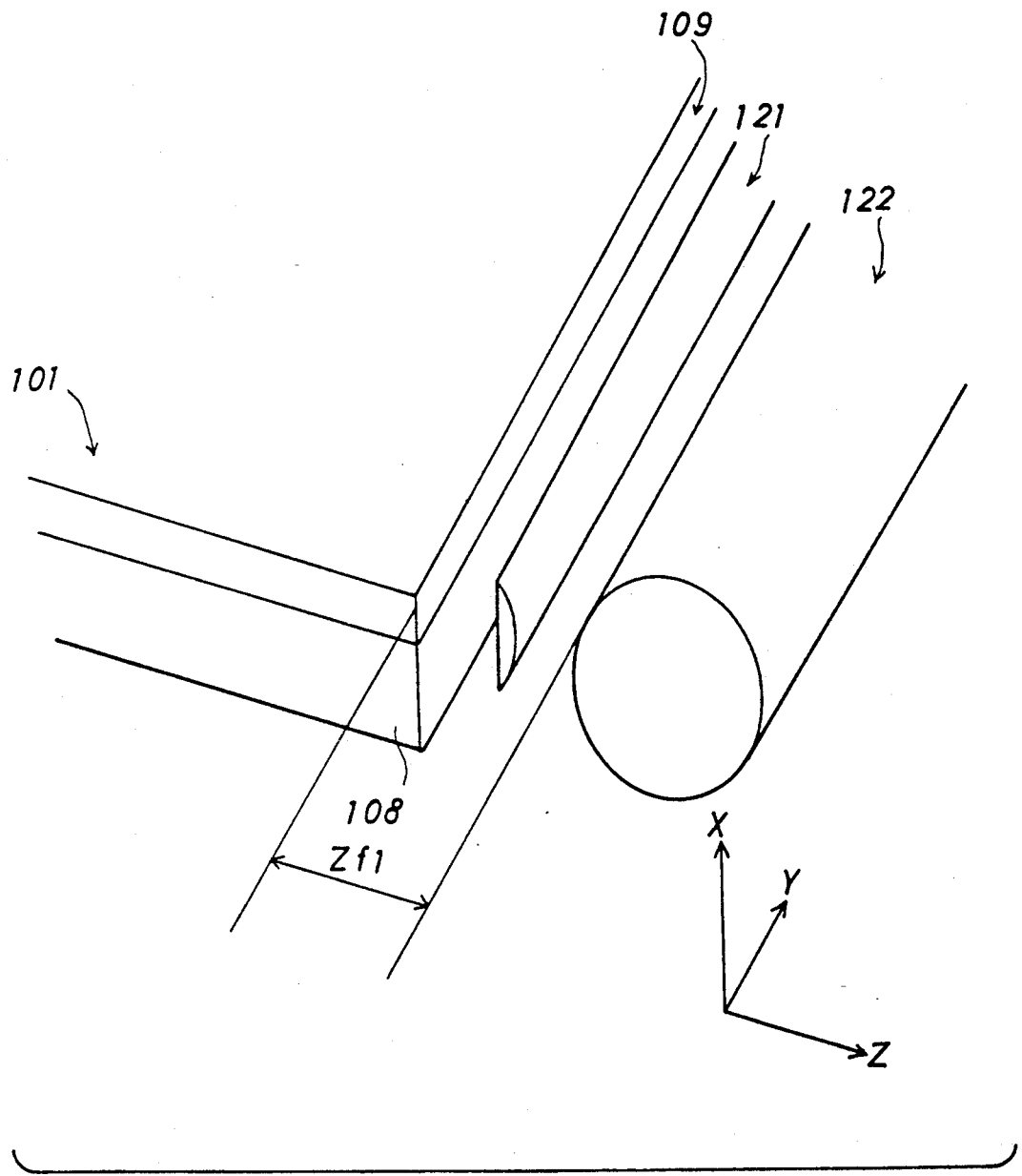
FIG. 10 is a perspective view around an irradiation portion of an optical scanning unit provided with the optical waveguide array.

In the second embodiment, an optical scanning unit using the optical waveguide array 101 is provided with a cylindrical lens 121 for focusing the light beams in the x-direction. In the optical scanning unit, as shown in FIG. 10, a photosensitive drum 122 is opposed to an irradiation surface 109. The cylindrical lens 121 for focusing the light beams in the x-direction is installed between the irradiation surface 109 and the photosensitive drum 122. The distance between the irradiation surface 109 and the photosensitive drum 122 equals Zf1 obtained from the equation (2)'. Consequently, the two-dimensionally refractive index profile lens portion B of the optical waveguide array 101 focuses the light beams emitted from the irradiation surface 109 in the y-direction to form a latent image on the surface of the photosensitive drum 122. On the other hand, the cylindrical lens 121 focuses the light beams emitted from the irradiation surface 109 in the x-direction on the surface of the photosensitive drum 122. As aforementioned, the optical scanning unit of the second embodiment can thus focus the light beams both in the x-direction and the y-direction.

In the second embodiment, a lens portion is formed for each of the optical waveguides composing the optical waveguide arrays 101. However, a single lens portion could be provided for multiple optical waveguides. In this case, the length of the two-dimensionally refractive index profile lens portion B should be set between the snaking cycle and three quarters of the snaking cycle of the light beams through the two-dimensionally refractive index profile lens portion B. In the y-direction the two-dimensionally refractive index profile lens portion B forms an image on the same focal position as the focal position at which the light beams have been irradiated on the interface between the optical waveguide array portion A and the two-dimensionally refractive index profile lens portion B. In the z-direction the focal position of the light beams emitted from the two-dimensionally refractive index profile lens portion B equals Zf1 obtained in the equation (2)'. By placing a photosensitive drum on the focal position, the spot of the light beams having the same diameter as that of the core layer 102 of the optical waveguide array portion A can be formed on the surface of the photosensitive drum.

Figure 11D:
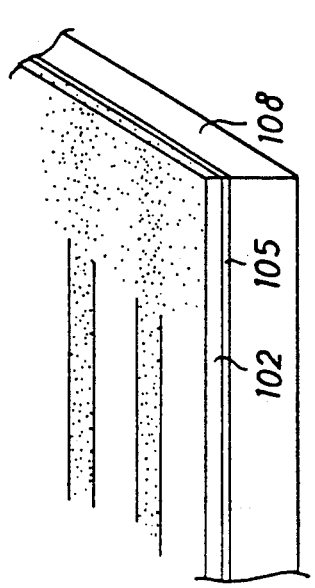
FIG. 11A through 11E are explanatory views showing in order the processes for manufacturing the optical waveguide array.
Figure 11E:
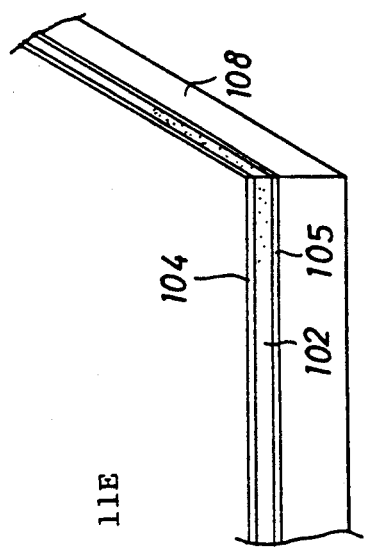
Figure 11A:
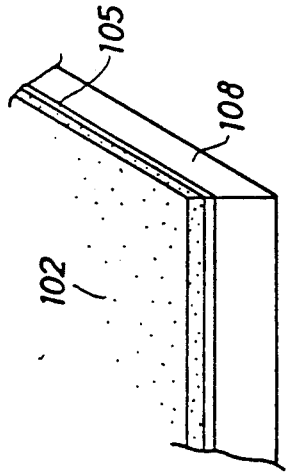
Figure 11B:
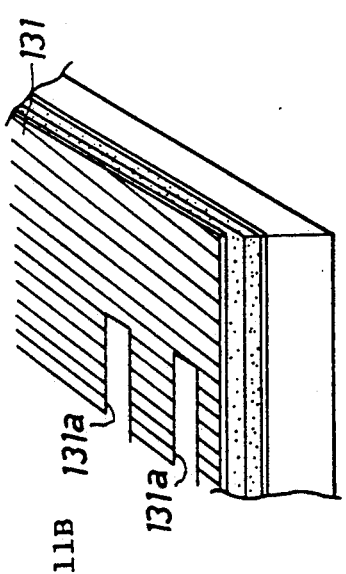
Figure 11C:
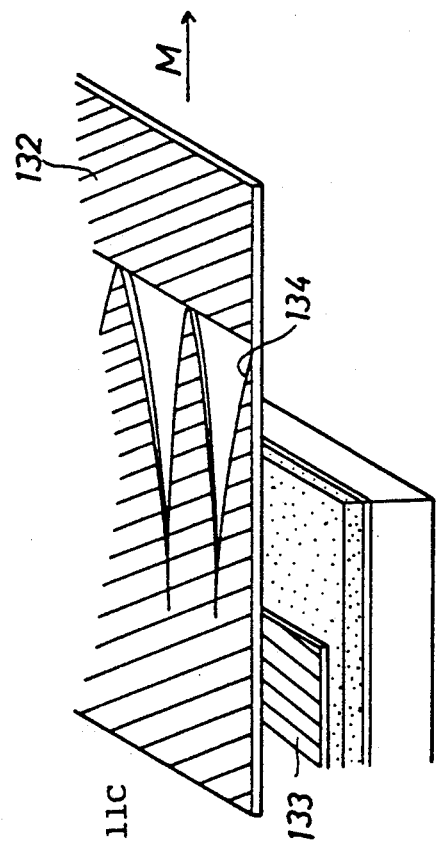
Figure 12:
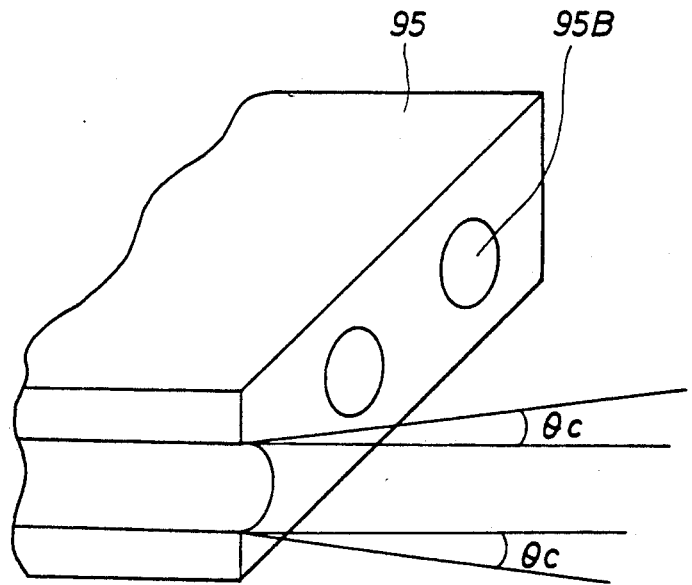
FIG. 12 is an explanatory view showing the diverged irradiation angle of the light beams emitted from the irradiation portion of a related-art optical waveguide array without a lens array.
Figure 13:
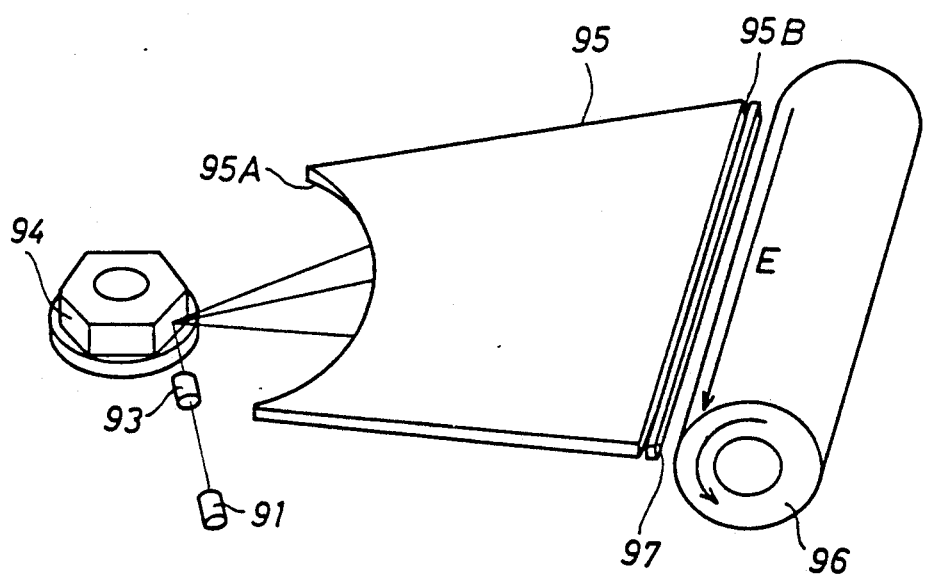
FIG. 13 is a perspective view of an optical scanning unit using the related-art optical waveguide array with the lens array.

A method for manufacturing the optical waveguide array 101 of the second embodiment will now be explained, referring to FIGS. 11A through 11E. As shown in FIG. 11A, the clad layer 105 of PMMA material is laid on the substrate 108. Over the clad layer 105, the core layer 102 is formed. The core layer 102 is formed of PMMA material including styrene or other resin whose refractive index can be varied through photo polymerization. The variances in the refractive index of such resin through the photo polymerization can be controlled by the irradiation energy of ultraviolet ray. Consequently, the desired distribution of the refractive index can be obtained by varying the irradiation energy of ultraviolet ray. As shown in FIG. 11B, a first mask 131 is laid over the core layer 102. The mask 131 has openings 131a for transmitting ultraviolet ray in the optical waveguide portion A. In this way, the photo polymerization is carried out only on the optical waveguide portion A. As shown in FIG. 11C, the optical waveguide portion A is covered with a second mask 133 after removing the mask 131. Ultraviolet ray is irradiated while moving a third mask 132 in the direction shown by an arrow M. The third mask 132 has ultraviolet transmission opening 134 in the form of wedges having vertexes at the center of each optical waveguide composing the optical waveguide array 101. The length of each ultraviolet transmitting opening 134 is longer than the length of the two-dimensionally refractive index profile lens portion B. When the third mask 132 is moved in the direction shown by the arrow M and ultraviolet ray is irradiated at the same time, the elongation of the central portion of each optical waveguide is exposed to ultraviolet ray for a relatively long time. The portion more distant from the central portion of each optical waveguide is exposed to ultraviolet ray for the shorter time. The configuration of the ultraviolet transmitting opening 134 determines the time period of the exposure to the ultraviolet ray. The configuration of the ultraviolet transmission opening 134 is determined such that the time period of the exposure to the ultraviolet ray is appropriate for the desired refractive index. In this determination, the relationship between the irradiation energy of the ultraviolet ray and the variances in the refractive index are considered. Subsequently, as shown in FIG. 11D, through a baking process, unreacted monomer is removed. As shown in FIG. 11E, the clad layer 104 of PMMA material is thus formed. Through the aforementioned processes, the optical waveguide portion A is formed integrally with the two-dimensionally refractive index profile lens B. The configuration of the third mask 132 is not limited to the aforementioned configuration if the desired irradiation energy of the ultraviolet ray is obtained. The desired irradiation energy of the ultraviolet ray could be obtained by scanning highly modulated light beams, without using the masks 131, 132 or 133.

This invention has been described above with reference to the preferred embodiments as shown in the drawings. Modifications and alterations may become apparent to one skilled in the art upon reading and understanding the specification. Despite the use of the embodiments for illustration purposes, however, it is intended to include all such modifications and alterations within the scope and spirit of the appended claims.

In this spirit, it should also be noted that in the embodiments as shown and described, the materials of the substrates 8, 24, 35, 108, the core layers 2, 27, 102, 106, and the clad layers 4, 5, 25, 26, 104, 105 are not limited to the aforementioned materials in the embodiments.

What is claimed is:

1. An optical waveguide array, comprising:
   a plurality of optical waveguides, each waveguide having an incidence portion for receiving light beams and an irradiation portion for irradiating light beams, each said waveguide transmitting light beams from said incidence portion to said irradiation portion; and
   lens means for focusing the light beams irradiated from said irradiation portion in a predetermined direction substantially perpendicular to a direction of transmitting light beams through each said waveguide, said leans means being coupled to each said waveguide,
   wherein said lens means includes a two-dimensionally refractive index profile lens, said profile lens including a pair of clad layers with a core layer therebetween, said clad layers having a low refractive index relative to said core layer and said core layer having a refractive index distributed two-dimensionally in said predetermined direction.

2. The optical waveguide array according to claim 1, wherein said irradiation portion includes an irradiation interface and said lens means is coupled to said interface.

3. The optical waveguide array according to claim 4, wherein said lens means is bonded to said interface.

4. The optical waveguide array according to claim 1, wherein said lens means is integrally formed with each said waveguide.

5. The optical waveguide array according to claim 1, wherein said lens means is coupled to each said waveguide with a center of said lens means coinciding with an optical axis of each said waveguide.

6. The optical waveguide device, comprising:
   an optical waveguide array having a plurality of waveguides, each waveguide having an incidence portion for receiving light beams and an irradiation portion for irradiating light beams, each said waveguide transmitting light beams from said incidence portion to said irradiation portion;
   first lens means for focusing the light beams irradiated from said irradiation portion in a predetermined direction substantially perpendicular to a direction of transmitting light beams through each said waveguide, said first lens means being coupled to each said waveguide; and
   second lens means for focusing the light beams emitted from said first lens means in a direction substantially perpendicular to both said direction of transmitting light beams and said predetermined direction, said second lens means being provided near said first lens means.

7. The optical waveguide device according to claim 6, wherein said first lens means is bonded to each said waveguide.

8. The optical waveguide device according to claim 6, wherein said first lens means is integrally formed with each said waveguide.

9. A method for manufacturing a two-dimensionally refractive index profile lens, comprising the steps of:
   providing a first clad layer, said first clad layer being planar;
   forming a core layer over said first clad layer, said core layer having a refractive index variable through photo polymerization to transmit light beams in a predetermined direction;
   irradiating light beams onto said core layer and continuously varying the irradiation energy to distribute the refractive index two-dimensionally; and
   coating said core layer with a second clad layer having a refractive index less than that of said core layer.

10. The method for manufacturing a two-dimensionally refractive index profile lens according to claim 9, wherein the step of irradiating light beams onto said core layer comprises:
    positioning a mask with wedge-shaped openings over said core layer; and
    irradiating light beams onto said masked core layer while moving said mask in a direction of transmitting light beams through said core layer.

11. The method for manufacturing a two-dimensionally refractive index profile lens according to claim 10, wherein the step of irradiating light beams onto said core layer comprises:
    exposing said core layer to ultraviolet rays for a predetermined time period controlled by said wedge-shaped openings in said mask.

12. The method for manufacturing a two-dimensionally refractive index profile lens according to claim 9, wherein said core layer comprises polymethyl methacrylate (PMMA) containing a resin having a refractive index variable with a photo polymerization.

13. The method for manufacturing a two-dimensionally refractive index profile lens according to claim 12, wherein said resin is styrene.

14. A method for manufacturing an optical waveguide array with a two-dimensionally refractive index profile lens, comprising the steps of:
providing a first clad layer, said first clad layer being planar;
forming a core layer including monomer over said first clad layer, said core layer having a refractive index variable through photo polymerization to transmit light beams in a predetermined direction;
positioning a first mask over said core layer, said first mask having rectangular openings over a first portion of said core layer;
irradiating light beams onto said masked core layer;
removing said first mask;
positioning a second mask over said first portion of said core layer for covering said first portion;
positioning a third mask with wedge-shaped openings over said core layer;
irradiating light beams onto said masked core layer while moving said third mask in a direction substantially parallel to said predetermined direction of said first portion and continuously varying the irradiation energy to distribute the refractive index two-dimensionally;
removing said second mask;
baking said core layer to remove unreacted monomer; and
coating said core layer with a second clad layer having a refractive index less than that of said core layer.

15. The method for manufacturing an optical waveguide array with a two-dimensionally refractive index profile lens according to claim 14, wherein said step of irradiating light beams onto said core layer while moving said third mask comprises:
moving said third mask in a manner that a vertex of each of wedge-shaped openings moves along a center line of each of areas of said first portion irradiated by said step of irradiating light beams onto said masked core layer.

16. The method for manufacturing an optical waveguide array with a two-dimensionally refractive index profile lens according to claim 14, wherein said step of irradiating light beams onto said core layer comprises:
exposing said core layer to ultraviolet rays for a predetermined time period controlled by said wedge-shaped openings in said third mask.

17. A method for manufacturing a two-dimensionally refractive index profile lens, comprising the steps of:
providing a glass plate containing ions;
masking the side surfaces of said plate; and
immersing said masked plate in a fused salt containing natrium or potassium ion, thereby exchanging ions in said plate with ions in the fused salt at a high temperature to provide the concentration gradient of ions for increasing the refractive index.

18. The method for manufacturing a two-dimensionally refractive index profile lens according to claim 17, wherein said ions provided in said glass plate are selected from the group consisting of lithium, cesium and thulium.

19. A method for manufacturing a two-dimensionally refractive index profile lens, comprising the steps of;
obtaining a borosilicate glass with a phase rich in silica gel ($SiO_2$) and a phase rich in one of sodium ($Na_2$) and boric acid ($B_2O_2$) by phase splitting between 500° C. and 600° C.;
treating said glass with at least one selected from a group consisting of hydrogen chloride (HCl), nitric acid ($HNO_3$) and sulfuric acid ($H_2SO_4$) at 100° C. to obtain porous glass rich in silica gel ($SiO_2$);
stuffing said glass with dopant of an aqueous solution of at least one of cesium nitrate ($CsNO_3$) or thallium nitrate ($TlNO_3$) at 100° C.;
masking the side surfaces of said glass;
eluting the dopant from the pores in said porous glass at a temperature between 70° C. and 100° C.; and
sintering said glass at a temperature between 700° C. and 800° C. to transform said glass into the lens.

* * * * *